US010185153B2

(12) United States Patent
Eash et al.

(10) Patent No.: US 10,185,153 B2
(45) Date of Patent: Jan. 22, 2019

(54) ORTHOGONAL OPTICAL PATH LENGTH EXTENDER (71) Applicant: Avegant Corp., Belmont, CA (US)

(72) Inventors: Aaron Matthew Eash, San Francisco, CA (US); Allan Thomas Evans, San Francisco, CA (US); Andrew John Gross, Redwood City, CA (US); D. Scott Dewald, Dallas, TX (US); Warren Cornelius Welch, III, Foster City, CA (US)

(73) Assignee: Avegant Corp., Belmont, CA (US)

( * ) Notice: Subject to any disclaimer, the term of this patent is extended or adjusted under 35 U.S.C. 154(b) by 0 days.

(21) Appl. No.: 15/675,659

(22) Filed: Aug. 11, 2017

(65) Prior Publication Data

US 2018/0045974 A1    Feb. 15, 2018

Related U.S. Application Data (63) Continuation-in-part of application No. 15/491,792, filed on Apr. 19, 2017, which is a continuation-in-part
(Continued)

(51) Int. Cl.
G02B 26/08     (2006.01)
G02F 1/29      (2006.01)
(Continued)

(52) U.S. Cl.
CPC ......... *G02B 27/283* (2013.01); *G02B 5/3058* (2013.01); *G02B 5/3083* (2013.01);
(Continued)

(58) Field of Classification Search
CPC .... G03B 35/18; G03B 35/26; G03B 21/2073; H04N 9/315; H04N 9/3105; G02F 1/00;
(Continued)

(56) References Cited

U.S. PATENT DOCUMENTS 3,586,416 A    6/1971  Bitetto
3,856,407 A    12/1974 Takeda et al.
(Continued)

FOREIGN PATENT DOCUMENTS

WO    2012104839 A1    8/2012
WO    2012175939 A1    12/2012
(Continued)

OTHER PUBLICATIONS

Hu, Xinda et al., "High-resolution optical see-through multi-focal-plane head-mounted display using freeform optics," Opt. Express 22, 13896-13903 (2014).
(Continued)

*Primary Examiner* — William R Alexander
*Assistant Examiner* — Tamara Y Washington
(74) *Attorney, Agent, or Firm* — HIPLegal LLP; Judith Szepesi (57) ABSTRACT

A system to adjust light path length comprising a digital light path length modulator is described. The digital light path length modulator comprises a polarization modulator to receive polarized light and to modulate a polarization of some or all of the polarized light, and an optical path length extender (OPLE) to direct the light entering the OPLE with a first polarization along a first light path through the OPLE, and to direct the light entering the OPLE with a second polarization along a second light path through the OPLE, the second light path through the OPLE having a light path length longer than the first light path length through the OPLE.

20 Claims, 13 Drawing Sheets

Related U.S. Application Data of application No. 15/358,040, filed on Nov. 21, 2016, said application No. 15/491,792 is a continuation-in-part of application No. 15/335,298, filed on Oct. 26, 2016, which is a continuation-in-part of application No. 15/236,101, filed on Aug. 12, 2016.

(51) Int. Cl.
  *G02B 27/28*  (2006.01)
  *G02F 1/01*  (2006.01)
  *G02B 5/30*  (2006.01)

(52) U.S. Cl.
  CPC ......... *G02B 27/286* (2013.01); *G02F 1/0136* (2013.01); *G02B 2207/117* (2013.01)

(58) Field of Classification Search
  CPC ....... G02F 1/13363; G02C 7/101; G02C 7/12; G02B 27/017; G02B 26/001; G02B 26/0841; G02B 26/02; G09G 3/3466; G09G 3/2074
  See application file for complete search history.

(56) References Cited

U.S. PATENT DOCUMENTS

| | | | |
|---|---|---|---|
| 4,670,744 A | 6/1987 | Buzak | |
| 5,610,765 A * | 3/1997 | Colucci | G02B 27/017 348/E9.024 |
| 5,751,243 A | 5/1998 | Turpin | |
| 6,515,801 B1 | 2/2003 | Shimizu | |
| 6,580,078 B1 | 6/2003 | O'callaghan et al. | |
| 7,360,899 B2 | 8/2008 | Mcguire, Jr. et al. | |
| 7,905,600 B2 | 3/2011 | Facius et al. | |
| 8,262,234 B2 | 9/2012 | Watanabe | |
| 8,755,113 B2 | 6/2014 | Gardner et al. | |
| 9,025,067 B2 | 5/2015 | Gray et al. | |
| 9,304,319 B2 | 4/2016 | Bar-Zeev et al. | |
| 9,494,805 B2 | 11/2016 | Ward et al. | |
| 9,588,270 B2 | 3/2017 | Merrill et al. | |
| 2002/0191300 A1 | 12/2002 | Neil | |
| 2003/0020925 A1 | 1/2003 | Patel et al. | |
| 2004/0156134 A1 | 8/2004 | Furuki et al. | |
| 2004/0263806 A1 | 12/2004 | Silverstein et al. | |
| 2005/0141076 A1 | 6/2005 | Bausenwein et al. | |
| 2006/0119951 A1 * | 6/2006 | McGuire, Jr. | G02B 27/0081 359/630 |
| 2007/0030456 A1 | 2/2007 | Duncan et al. | |
| 2007/0030543 A1 | 2/2007 | Javidi et al. | |
| 2007/0139760 A1 | 6/2007 | Baker et al. | |
| 2007/0146638 A1 | 6/2007 | Ma et al. | |
| 2008/0130887 A1 | 6/2008 | Harvey et al. | |
| 2008/0174741 A1 | 7/2008 | Yanagisawa et al. | |
| 2009/0061505 A1 | 3/2009 | Hong et al. | |
| 2009/0061526 A1 | 3/2009 | Hong et al. | |
| 2009/0237785 A1 | 9/2009 | Bloom | |
| 2009/0244355 A1 | 10/2009 | Horie | |
| 2011/0032436 A1 | 2/2011 | Shimizu et al. | |
| 2011/0149245 A1 | 6/2011 | Barth et al. | |
| 2012/0075588 A1 | 3/2012 | Suga | |
| 2013/0070338 A1 | 3/2013 | Gupta et al. | |
| 2013/0100376 A1 | 4/2013 | Sawado | |
| 2013/0222770 A1 | 8/2013 | Tomiyama | |
| 2013/0344445 A1 | 12/2013 | Clube et al. | |
| 2014/0168035 A1 | 6/2014 | Luebke et al. | |
| 2015/0061976 A1 | 3/2015 | Ferri | |
| 2015/0205126 A1 | 7/2015 | Schowengerdt | |
| 2015/0319342 A1 | 11/2015 | Schowengerdt | |
| 2016/0041390 A1 * | 2/2016 | Poon | G02B 3/04 345/8 |
| 2016/0041401 A1 | 2/2016 | Suga | |
| 2016/0077338 A1 | 3/2016 | Robbins et al. | |
| 2016/0131920 A1 | 5/2016 | Cook | |
| 2016/0195718 A1 | 7/2016 | Evans | |
| 2016/0225337 A1 | 8/2016 | Ek et al. | |
| 2016/0227195 A1 | 8/2016 | Venkataraman et al. | |
| 2017/0038579 A1 | 2/2017 | Yeoh et al. | |
| 2017/0068103 A1 | 3/2017 | Huang et al. | |
| 2017/0075126 A1 | 3/2017 | Carls et al. | |
| 2017/0097507 A1 | 4/2017 | Yeoh et al. | |
| 2017/0146803 A1 * | 5/2017 | Kishigami | G02B 27/0179 |
| 2017/0160518 A1 | 6/2017 | Lanman et al. | |
| 2018/0045973 A1 | 2/2018 | Evans et al. | |
| 2018/0045974 A1 | 2/2018 | Eash et al. | |
| 2018/0045984 A1 | 2/2018 | Evans et al. | |
| 2018/0149862 A1 | 5/2018 | Kessler et al. | |

FOREIGN PATENT DOCUMENTS

| | | |
|---|---|---|
| WO | 2015190157 A1 | 12/2015 |
| WO | 2016087393 A1 | 6/2016 |

OTHER PUBLICATIONS

Lee, Yun-Han et al., Switchable Lens for 3D Display, Augmented Reality and Virtual Reality. Society for Information Display (SID), International Symposium Digest of Technical Papers, vol. 47, Issue 1, May 25, 2016 (4 page).

Matjasec et al., "All-Optical Thermos-Optical Path Length Modulation based on the Vanadium-Doped Fibers," Optical Society of America, vol. 21, No. 10, May 2013, pp. 1-14.

Pate, Michael, Polarization Conversion Systems for Digital Projectors, Web Publication, Apr. 21, 2006, Downloaded from http://www.zemax.com/os/resources/learn/knowledgebase/polarization-conversion-systems-for-digital-projectors on Jun. 17, 2016 (8 pages).

Polatechno Co., Ltd., LCD Projector Components, http://www.polatechno.co.jp/english/products/projector.html downloaded Jun. 17, 2016 (2 pages).

Sandner et al., "Translatory MEMS Actuators for optical path length modulation in miniaturized Fourier-Transform infrared spectrometers," MEMS MOEMS 7(2), Apr.-Jun. 2008 pp. 1-11.

* cited by examiner

Fig. 5

ORTHOGONAL OPTICAL PATH LENGTH EXTENDER

RELATED APPLICATIONS

The present application claims priority to U.S. patent application Ser. No. 15/236,101, filed on Aug. 12, 2016, U.S. patent application Ser. No. 15/358,040 filed on Nov. 21, 2016, and U.S. patent application Ser. No. 15/491,792 filed Apr. 19, 2017. All of the above applications are incorporated herein by reference.

FIELD

The present invention relates to optics, and more particularly to extending light paths.

BACKGROUND

Providing multiple focal planes, or discrete steps of focus adjustment, is useful for a number of applications. It can be part of creating a more realistic three dimensional display, as well as the ability to capture three dimensional data. In the prior art, multiple focus capture utilized mechanical movement such as gears or liquid lenses. Such mechanisms are expensive, slow, and relatively fragile. Another prior art method of capturing multiple focal lengths uses multiple mirrors and lenses. This is like having multiple cameras; it is bulky and expensive. Because of the bulk and expense, it also limits the number of focal lengths that can be simultaneously captured. A large beam splitter has also been used in the prior art to create two light path lengths. However, this is also a bulky solution.

Such prior art solutions are some combination of large, expensive, and slow. Liquid lenses are expensive and slow, and large beam splitters are large. This makes them difficult to use, and not useful for size or cost constrained systems, particularly portable or worn devices.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

A digital light path length modulator is described. The digital light path length modulator includes an optical path length extender (OPLE) and a polarization modulator, and can be used to adjust the path length of light. In one embodiment, light with state 2 polarization travels through a longer path in the OPLE than light with state 1 polarization. This can be used to create two focal planes.

In one embodiment, an OPLE is made up of one or more polarization sensitive reflective elements, which cause light of one polarization state to travel a longer path than light of the other polarization state. In one embodiment, the OPLE comprises a cuboid with one or two diagonal polarization sensitive reflective elements, and quarter wave plate and a mirror on both sides. Light of a second polarization state is reflected by the polarization sensitive reflective element, passes through the quarter wave plate, is reflected by the mirror and passes through the quarter wave plate for the second time. This reverses the polarization of the light, which is reflected at least once more prior to exiting the orthogonal OPLE. In one embodiment, the structure supporting the polarization sensitive reflective elements are four triangular prisms arranged in a cuboid, which support two differently oriented angled polarization sensitive reflective elements and with a light path extender on one side. In one embodiment, the angled polarization sensitive reflective element comprises a wire grid polarizer or a thin-film polarizer coating. In one embodiment, the OPLE may be made up of one or more plates with a plurality of polarization sensitive reflective elements. A plurality of digital light path length modulators create a modulation stack.

In one embodiment, by using a modulation stack, the number of focal planes can be increased. This provides the capacity to build a system that can meet the physiological requirements of human vision, by creating a display in which the 3D cues of overlap, focus, and vergence match. This produces a better quality 3D display and can prevent the headaches associated with 3D displays.

This mechanism in one embodiment can also be used for image capture, and various other uses in which light waves or other waves in a similar spectrum are either projected or captured, including but not limited to cameras, binoculars, 3D printing, lithography, medical imaging, etc. Creating a simple, easy to manufacture digital light path length modulator is like the step from vacuum tubes to transistors; it enables more complex, cheaper, and much more dense digitally controlled elements, which can become building blocks for a wide range of uses.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
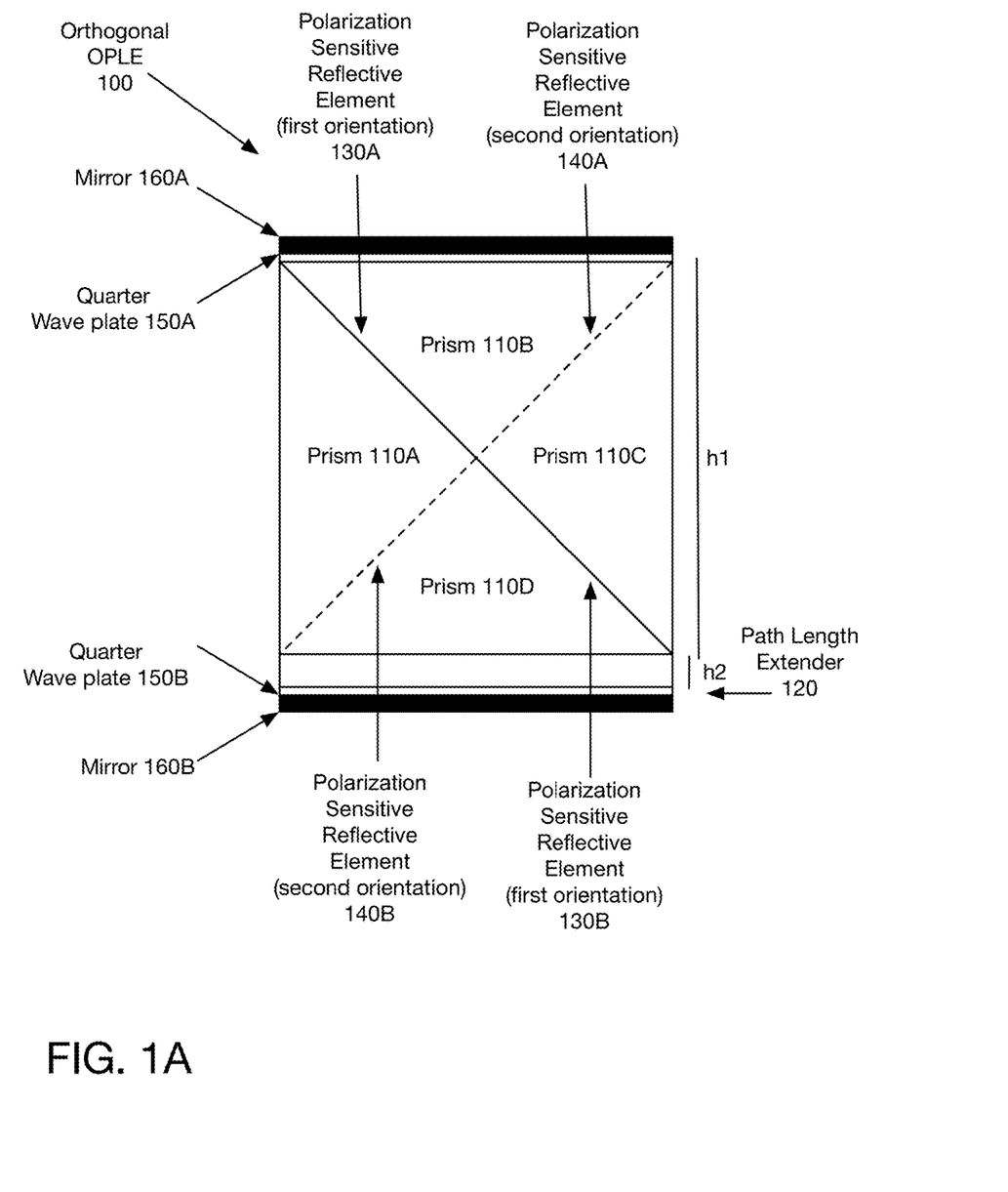
FIG. 1A is diagram of one embodiment of an orthogonal optical light path length extender (OPLE).

FIG. 1A is diagram of one embodiment of an orthogonal optical light path length extender (OPLE). The orthogonal OPLE 100 includes four prisms 110A, 110B, 110C, and 110D, arranged to form a cuboid. In one embodiment, the cuboid is a square cuboid. The prisms 110A, 110B, 110C, 110D define an entry surface (base of prism 110A), an exit surface (base of prism 110C), and two sides (bases of prisms 110B and 110D). In one embodiment, the height (h1) of the face defined by prisms 110A, 110B, 110C, and 110D is between 5 mm and 100 mm. In one embodiment, the height is based on an aperture of the system.

Between the contact areas of the prisms 110A, 110B, 110C, 110D are angled polarization sensitive reflective elements (in one embodiment wire grid polarizers) 130A, 130B, 140A, 140B. The first diagonal formed by the prisms, formed by the shared edges prisms 110A and 110B and the shared edges of prisms 110C and 110D, has a wire grid polarizer in a first orientation 130A, 130B, and the perpendicular diagonal, formed by the shared edges of prisms 110B and 110C and the shared edges of prisms 110A and 110D, has a wire grid polarizer in a second orientation 140A, 140B.

A path length extender 120 is positioned at one side of the OPLE 100, here on the base of prism 110D. In one embodiment, the height of the path length extender 120 (h2) is between ¼ mm to 30 mm.

On both sides of the OPLE 100 there is a quarter wave plate 150A, 150B and mirror 160A, 160B. In one embodiment, the quarter wave plate 150A, 150B is a birefringent material such as mica. In one embodiment, the quarter wave plate 150A, 150B is a polycarbonate film, which may be applied to the base of the side prism 110B and the base of the path length extender 120. In another embodiment, the quarter wave plate 150B may be applied to the top of the path length extender 120 or the bottom of prism 110D.

In one embodiment, the prisms 110A, 110B, 110C, 110D and path length extender 120 are made of material transparent to the wavelengths being used, e.g. optically transparent for light in optical wavelengths. The prisms 110A, 110B, 110C, 110D and path length extender 120 are glued together, in one embodiment.

Figure 1B:
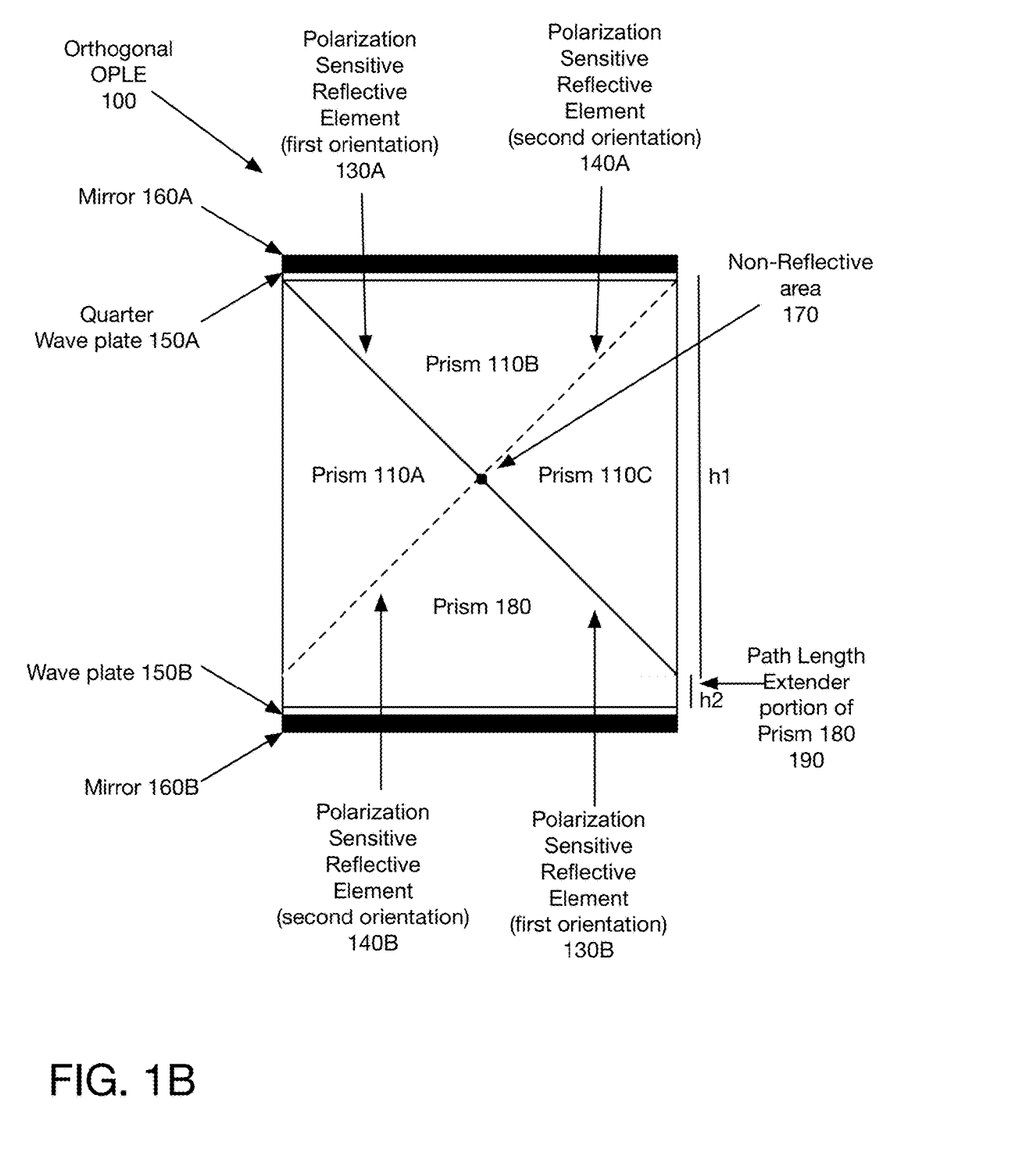
FIG. 1B is a diagram of an alternative embodiment of the orthogonal OPLE.

FIG. 1B illustrates an alternative embodiment in which the prism on one side is a pentagonal prism 180. In this embodiment, the path length extender 190 may be manufactured as part of one of the prisms, here prism 180. Prism 180 replaces prism 110D and path length extender 120 shown in FIG. 1A.

Additionally, in one embodiment there is a small non-reflective area 170 on the tip of the prisms forming the intersection of the prisms 110A, 110B, 110C, 180. In one embodiment, the non-reflective area 170 may be a black spot in the cross section. The non-reflective area 170 ensures that light hitting the intersection point does not cause scattering of the light.

The embodiments of FIGS. 1A and 1B are not designed to be exclusive, and the elements may be mixed and matched.

Figure 2A:
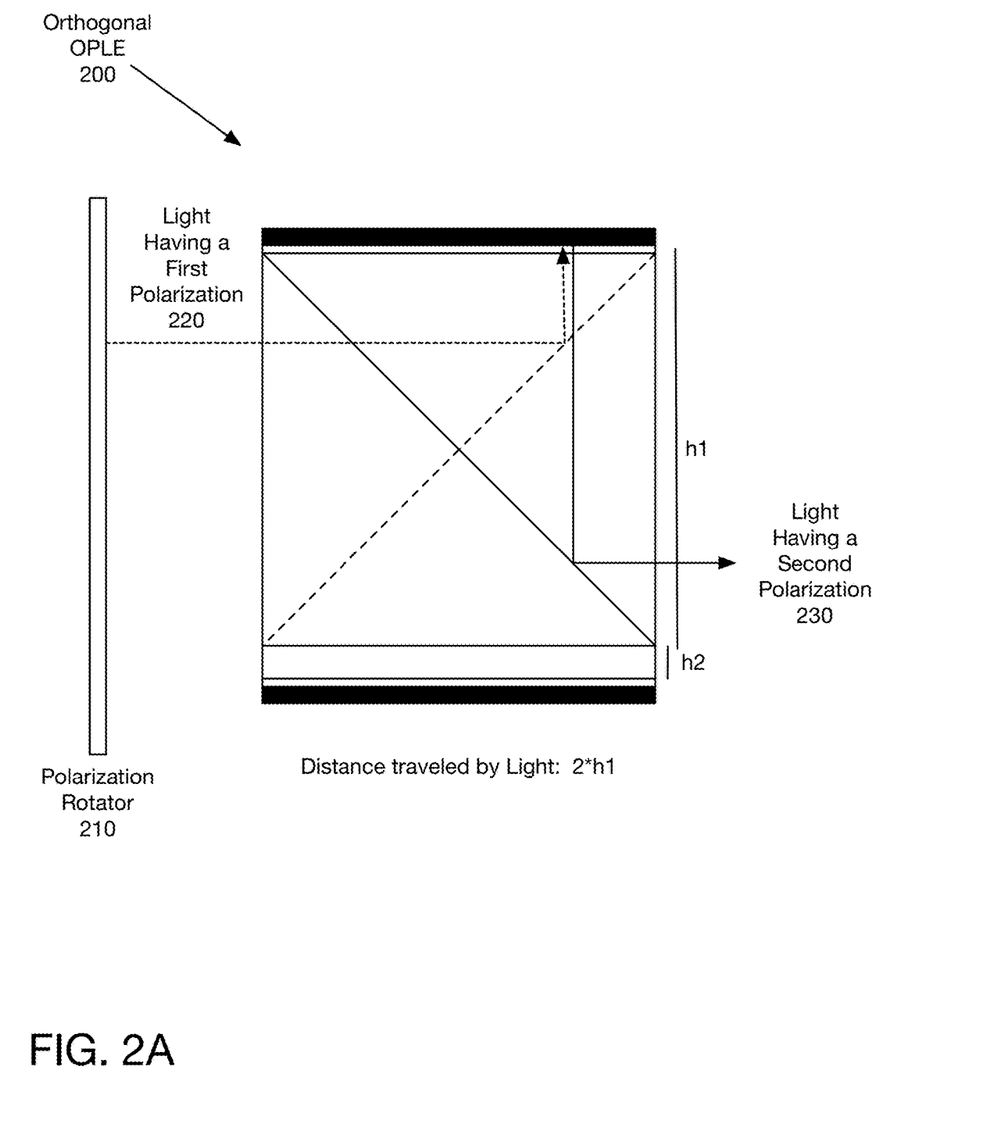
FIGS. 2A-2C are diagrams illustrating light paths through the orthogonal OPLE.
Figure 2B:
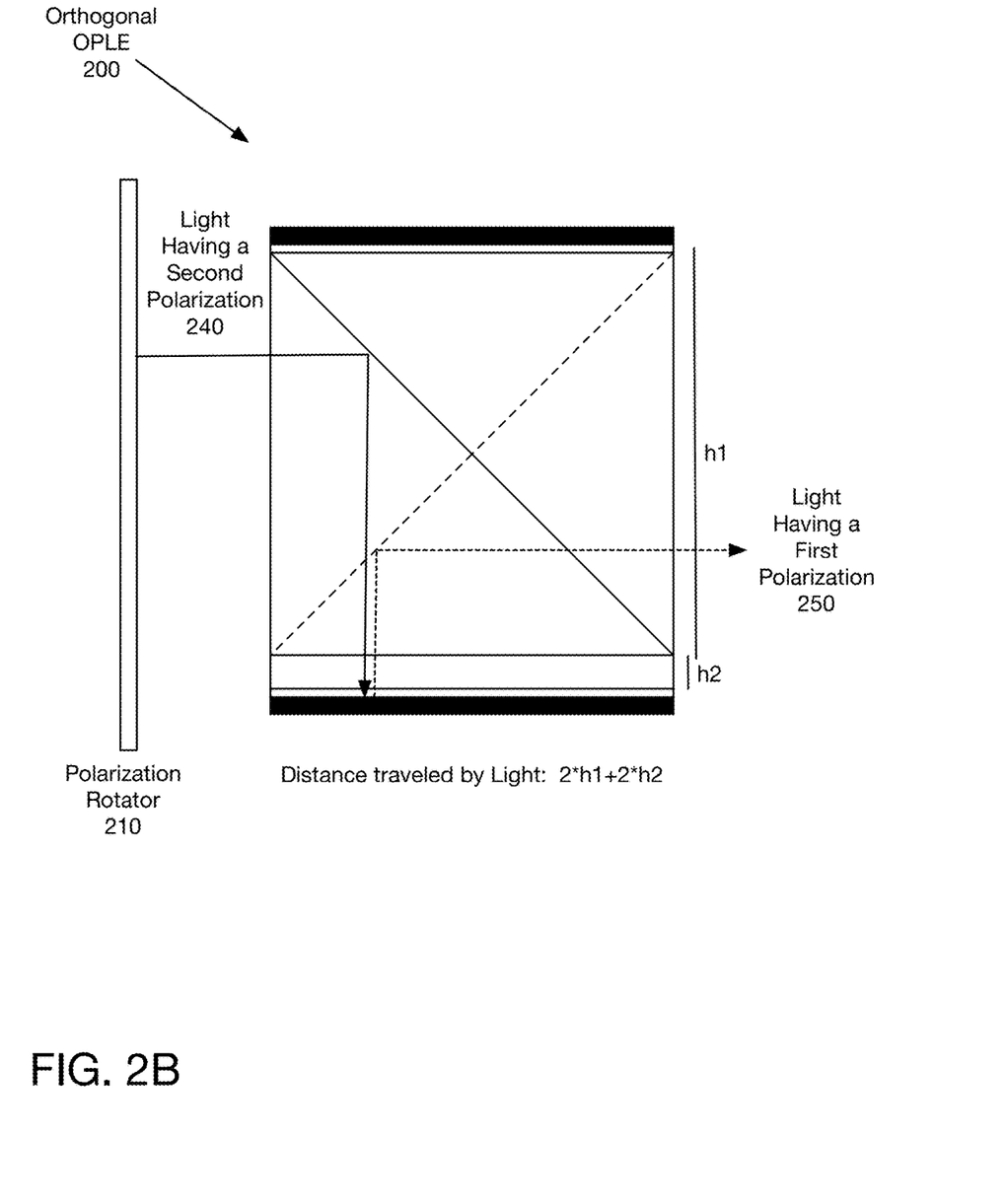
Figure 2C:
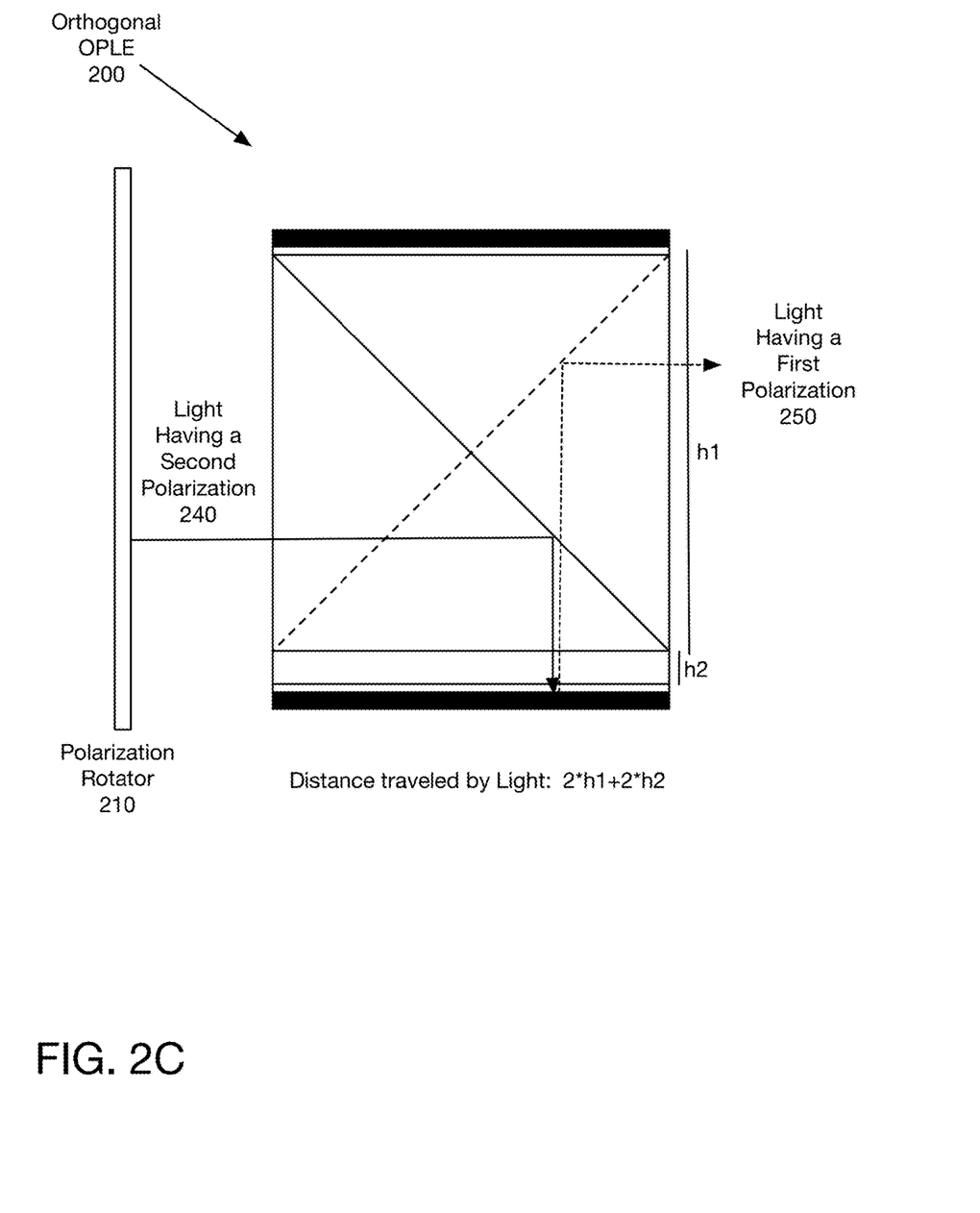

FIGS. 2A-2C illustrate the light paths followed by light in the orthogonal OPLE of FIG. 1A. To enable seeing the light paths, the light bounced from the mirror is offset slightly. One of skill in the art would understand that this offset is for illustration purposes only. FIG. 2A illustrates the light path for light having a first polarization 220. The light with the first polarization exits polarization rotator 210, and enters orthogonal OPLE 200. It passes through the wire grid with the first orientation, and is reflected by the wire grid with the second orientation. It passes through quarter wave plate, then is reflected by the mirror. Due to passing through the quarter wave plate twice, the light now has the second polarization. Therefore, it passes through the wire grid with the second orientation, and is reflected out of the orthogonal OPLE 200 by the wire grid with the first orientation. The length of the light path through the OPLE 200 is 2*h1, twice the length of the sides of the square formed by the prisms. Note that although it is illustrated as having a thickness, the quarter wave plate does not add significantly to the light path length.

FIG. 2B illustrates the light path for light having a second polarization 240. The light with the second polarization exits polarization rotator 210, and enters orthogonal OPLE 200. It is reflected by the wire grid with the first orientation, and passes through the light path extender. It passes through the quarter wave plate, and is reflected by the mirror back through the quarter wave plate and the path length extender. Due to passing through the quarter wave plate twice, the light now has the first polarization. Therefore, it is reflected out of the orthogonal OPLE 200 by the wire grid with the second orientation. The length of the light path through the OPLE 200 is 2*h1+2*h2, twice the length of the sides of the square formed by the prisms plus twice the length of the path length extender. In a typical configuration of a 10 mm×10 mm prism, and a 2 mm light path extender, the difference in the light paths therefore is 20%, 20 mm to 24 mm. In one embodiment, a polarization modulator is placed before the OPLE, so that light of one polarization is sent through the OPLE 200, resulting in all of the light exiting at the same time, having traveled the same path length. In another embodiment, the light sent through the OPLE may include light of both polarizations, and the polarization selection may occur after the light goes through the OPLE 200.

FIG. 2C illustrates the light path for light having the second polarization entering the OPLE 200 at a different location. As can be seen, in this instance the light passes through the wire grid with the first orientation, before being reflected by the wire grid with the second orientation through the light path extender. Thus, the distance traveled by the light is again 2*h1+2*h2.

Figure 3A:
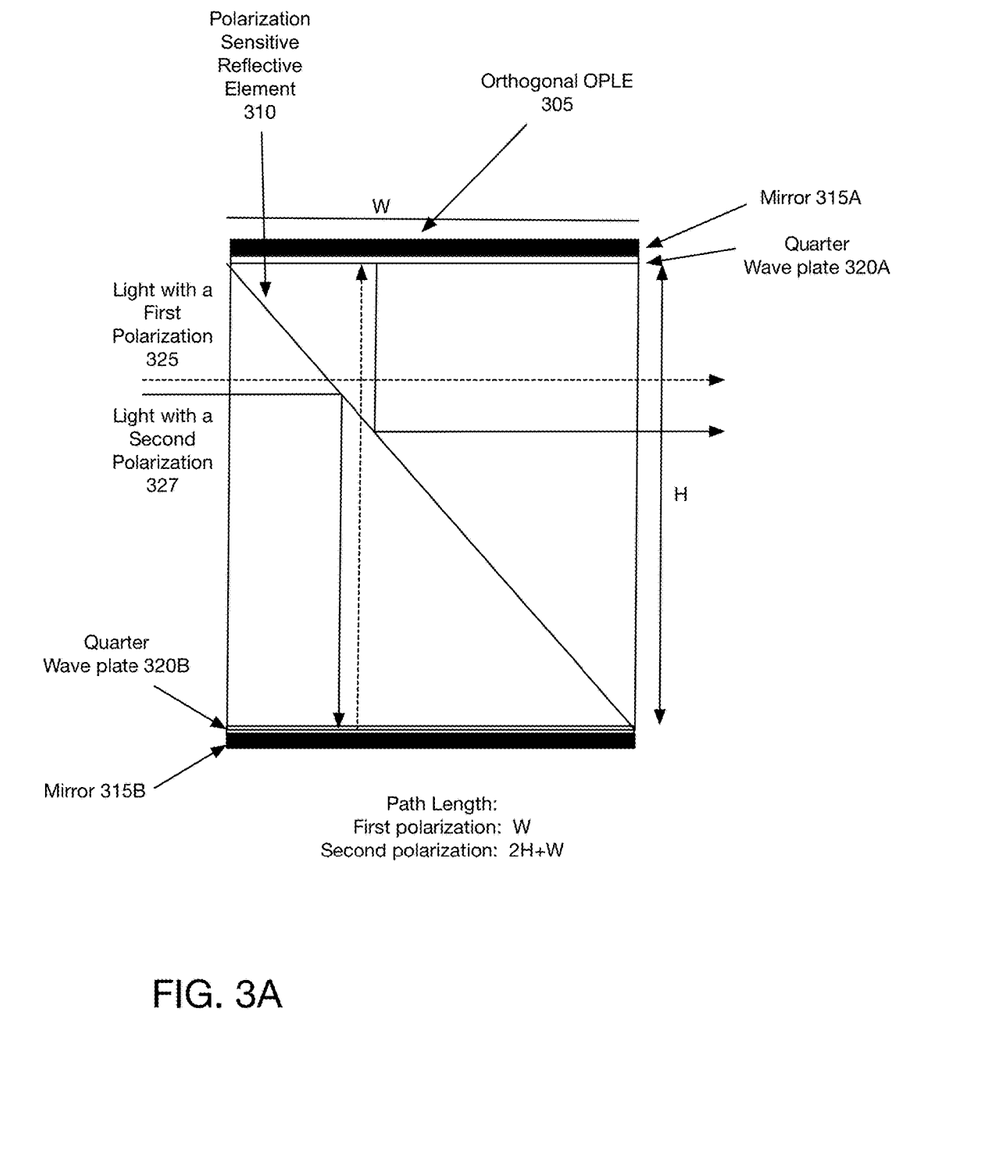
FIG. 3A is a diagram of another embodiment of an orthogonal OPLE, using a single angled polarization sensitive reflective element.

FIG. 3A illustrates an alternative embodiment of the orthogonal OPLE. In this embodiment, there is only a single polarization sensitive reflective element (in one embodiment a wire grid polarizer) 310, framed by the two quarter wave plates 320A, 320B and mirrors 315A, 315B. In one embodiment, this configuration may be built with two triangular prisms. In another embodiment, this configuration may be built with a single triangular prism.

In one embodiment, this configuration does not utilize a light path extender, in one embodiment, because there is a single polarization sensitive reflective element only the light with the second polarization is reflected. Light with the first polarization 325 passes straight through the OPLE 305. Light with the second polarization 327 is reflected by the polarization sensitive reflective element 310, passes through the quarter wave plate 320B, is reflected by the mirror, and passes through the quarter wave plate 320B again. It now has the first polarization and thus passes through the polarization sensitive reflective element 310 before encountering the second quarter wave plate 320A, and being bounced back once more, with the polarization rotated back to the second polarization. It then impacts the polarization sensitive reflective element 310 for the third and last time, and is reflected out of the OPLE 305. Thus, for a square cross-section of orthogonal OPLE 305, the path length for the light with the first polarization is W, the width of the polarizer 305, while the path length for the light with the second polarization is 2H+W (or 3H), since it bounces twice between the sides of the OPLE 305.

Figure 3B:
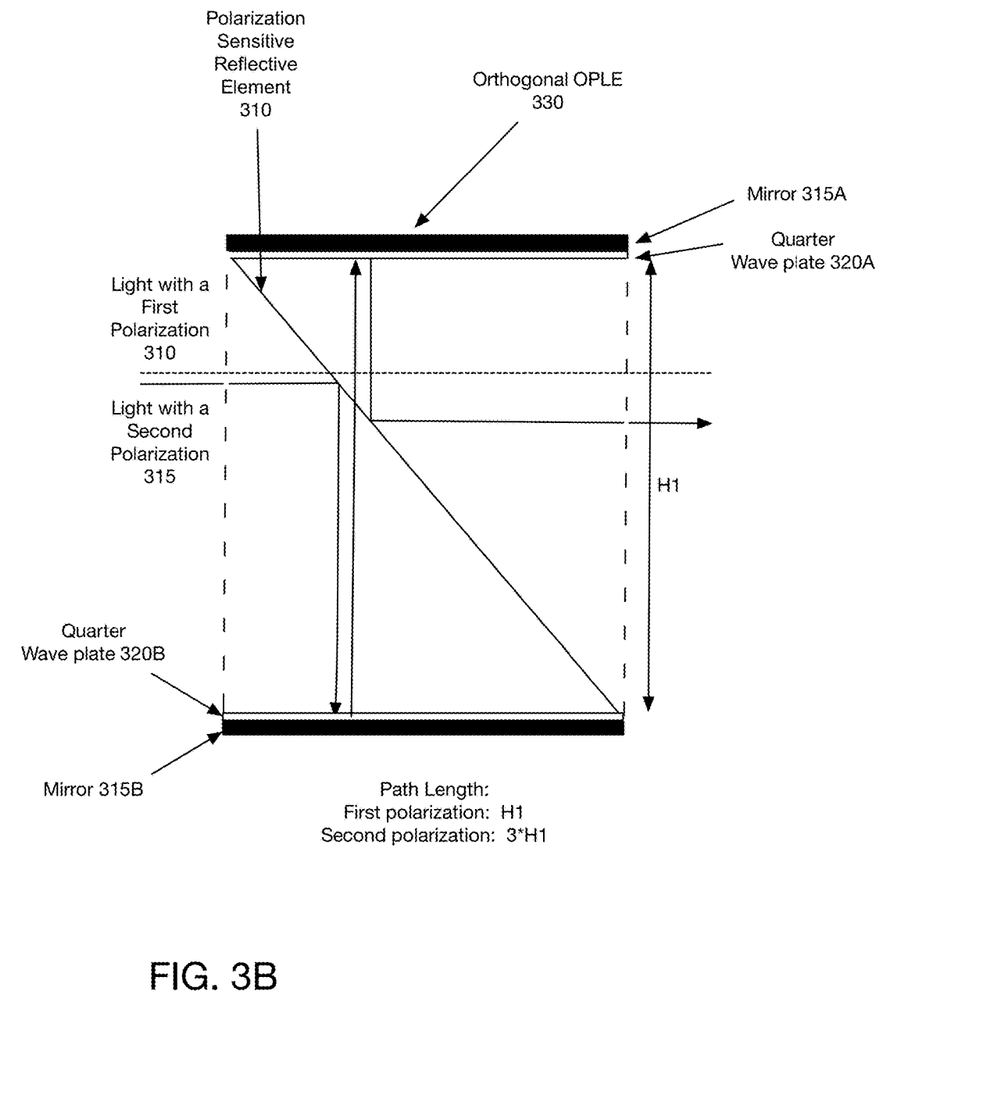
FIG. 3B is a diagram of a different configuration of an orthogonal OPLE with a single angled polarization sensitive reflective element.

FIG. 3B illustrates an alternative embodiment of the OPLE with a single polarization sensitive reflective element. In this configuration, the OPLE 330 includes the same elements of polarization sensitive reflective element 310, two quarter wave plates 320A, 320B, and two mirrors 315A, 315B. However, instead of utilizing prisms to position the polarization sensitive reflective element 310, the polarization sensitive reflective element 310 is supported by a different support structure. In one embodiment, the support structure may be a thin sheet of glass, plastic, film, or other material that can provide support for a polarization sensitive reflective element such as a wire grid polarizer or a thin film polarizer coating and can maintain its structure. In one embodiment, the prisms may be replaced by air, and the polarization sensitive reflective element 310 may be supported on one or more edges of the support structure by being attached to a frame or other structure. In another embodiment, the polarization sensitive reflective element may be supported by a support structure such as a diagonal piece of glass, plastic, or other optically transparent material. This configuration may be useful if weight is a concern.

Figure 3C:
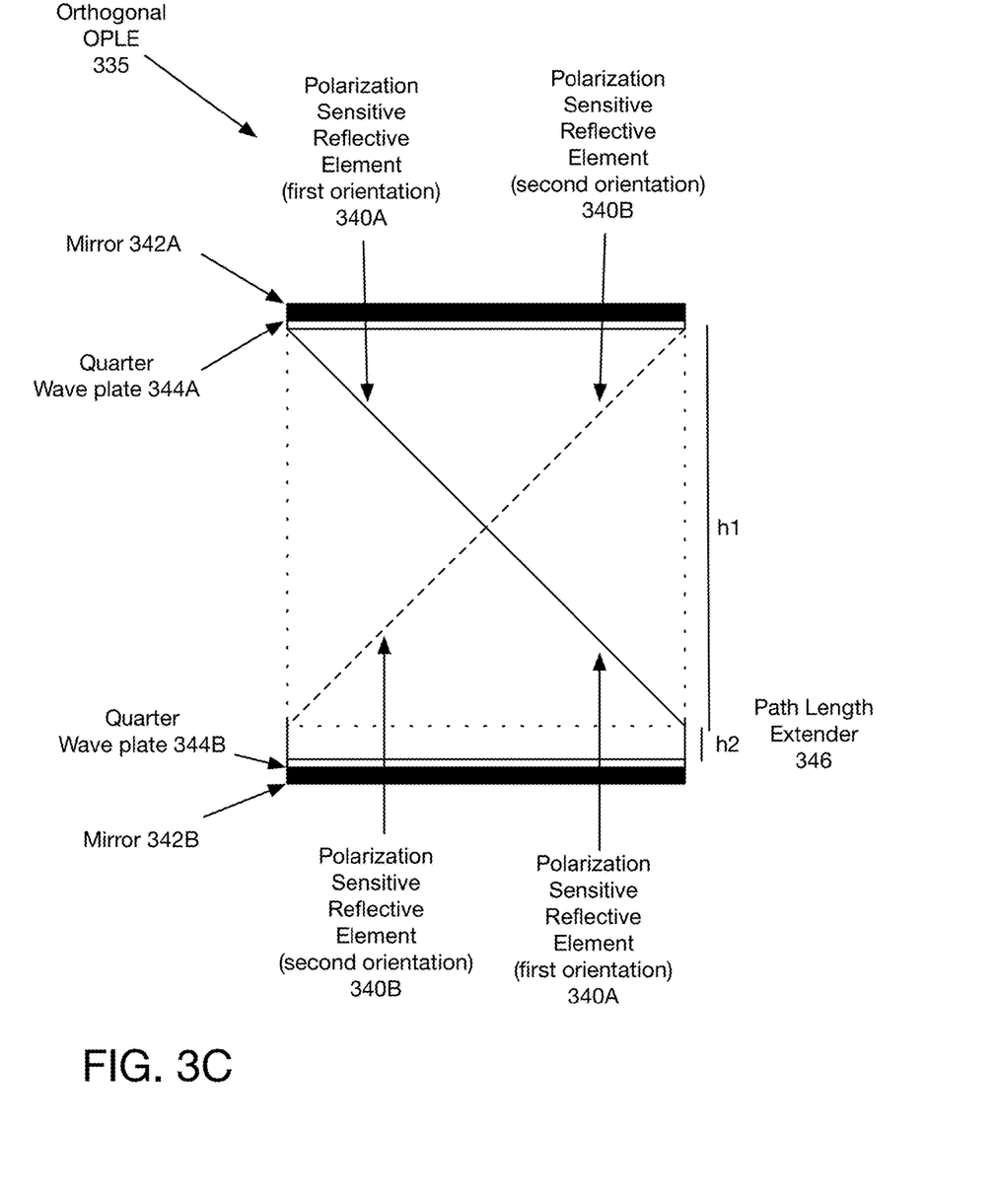
FIG. 3C is a diagram of another embodiment of an orthogonal OPLE, with two angled polarization sensitive reflective elements.

FIG. 3C illustrates an embodiment of the OPLE 335 shown in FIGS. 1A and 1B, without the prism supporting structure. This configuration includes a support framework for the polarization sensitive reflective elements 340A, 340B, but does not include the prisms shown in FIG. 1A. In one embodiment, the polarization sensitive reflective elements 340A, 340B are fastened to the top of the path length extender portion 346 of the OPLE 335. In one embodiment, the path length extender may be formed by a framework which provides a spacing between the bottom of the polarization sensitive reflective elements 340A, 340B and the quarter wave plate 344B.

Figure 3D:
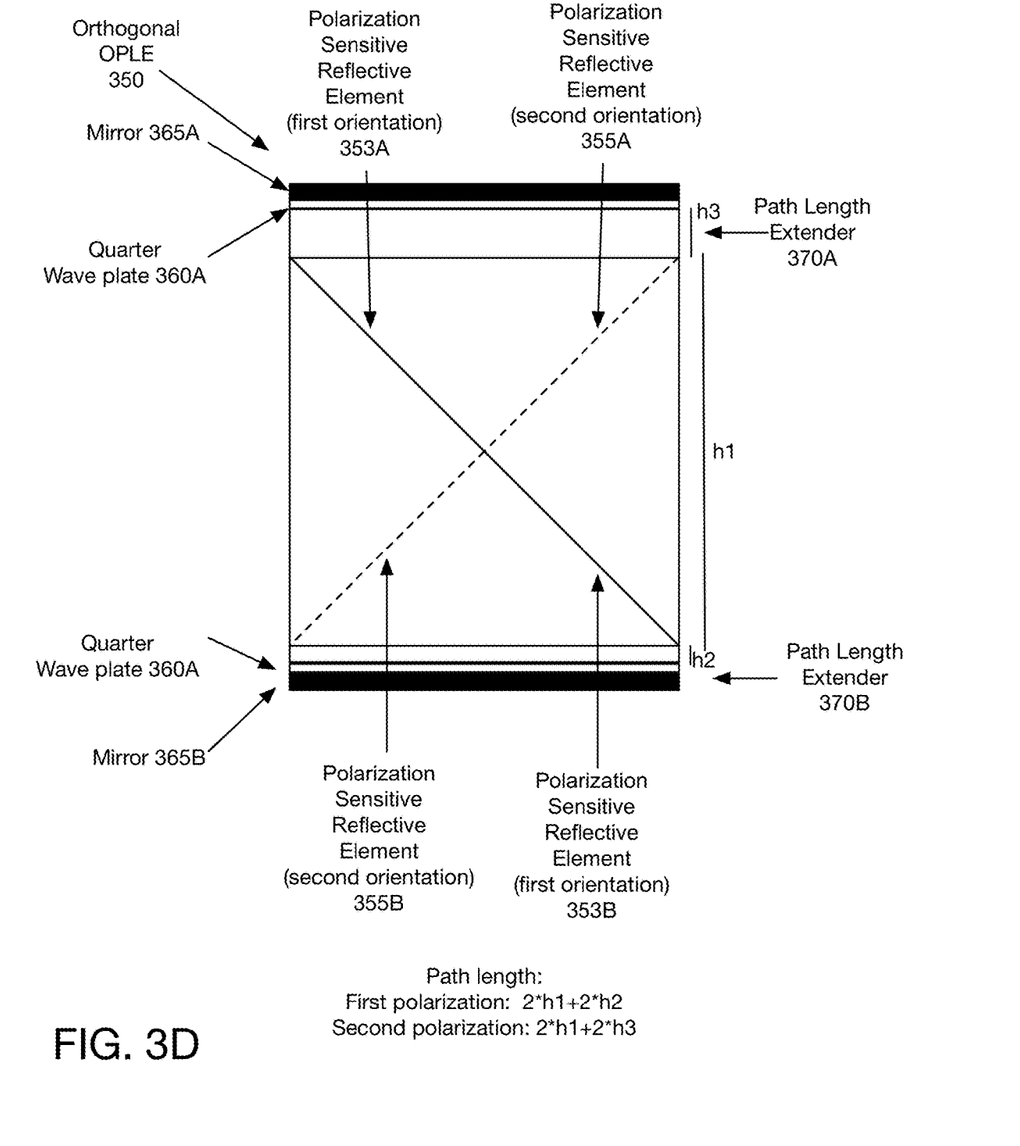
FIG. 3D is a diagram of one embodiment of an orthogonal OPLE with two path length extenders.

FIG. 3D illustrates an alternative embodiment of an OPLE. In this configuration, both sides of the OPLE 350 have a path length extender 370A, 370B. In this configuration, the difference in path length is the difference in the height of the path length extender 370A, 370B. In one embodiment, the system may provide an adjustable height, enabling changes in the light path length. In one embodiment, the height may be adjusted by moving the mirror relative to the rest of the OPLE to create a longer or shorter path length extender on either or both sides of the OPLE.

Figure 3E:
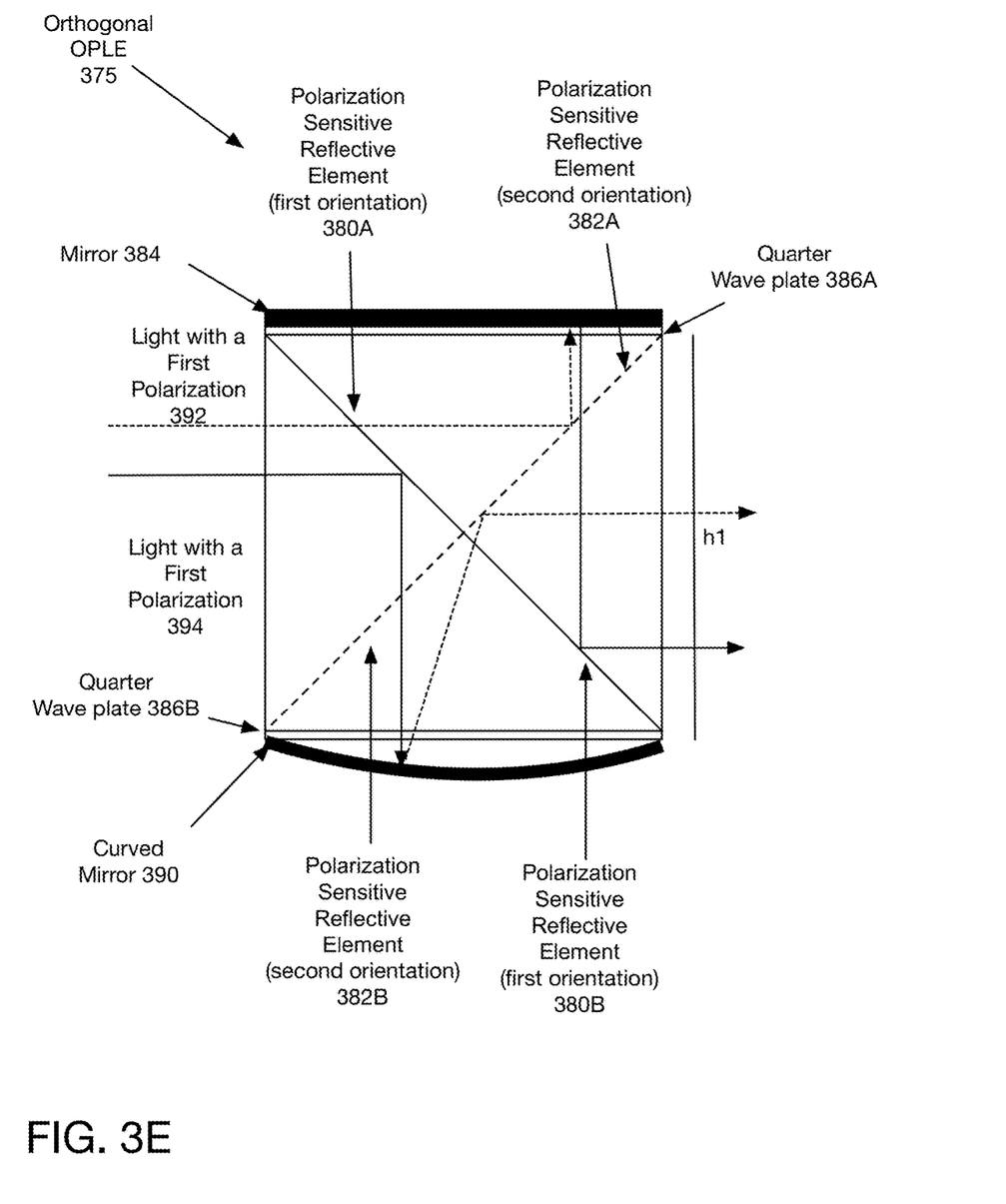
FIG. 3E is a diagram of one embodiment of an orthogonal OPLE using a curved mirror.

FIG. 3E illustrates another embodiment of an OPLE. In this configuration, the light path length extension on one or both sides is provided by a curved mirror 390. In one embodiment, no light path length extender is needed. In another embodiment, an optional light path extender is used. By using mirrors which have an optical power the virtual object distance is modulated. This may be combined with a light path extender (not shown).

Figure 4A:
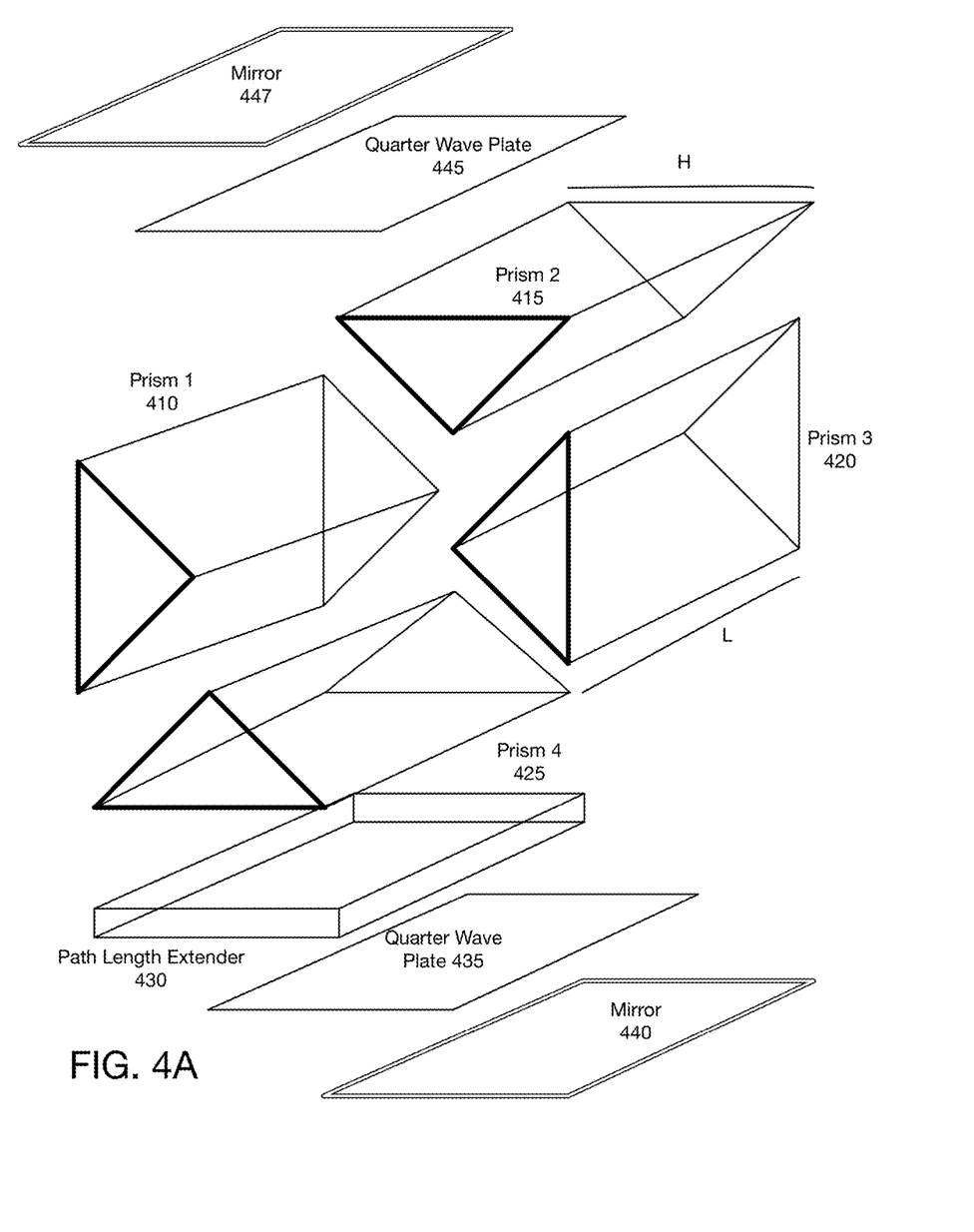
FIG. 4A is a diagram of one embodiment of the assembly of one embodiment of an orthogonal OPLE.

FIG. 4A is a diagram of one embodiment of assembling the pieces of an orthogonal OPLE. The triangular prisms 410, 415, 420, 425 are matched in size. In one embodiment, each prism 410, 415, 420, 425 has isosceles triangle ends. The triangles in one embodiment are 90-45-45 triangles. In one embodiment, the prisms are made of glass or plastic that is transparent to the wavelengths used by the system. For visual object representation or capture, the prism is transparent to light in the visual frequency range.

The wire grid or other polarization sensitive reflective element (not shown) is placed on the prisms. In one embodiment, wire grids may be placed on the prisms, glued onto the prisms, or nano-imprinted on the prisms. In one embodiment, one side of each prism 410, 415, 420, 425 has a wire grid placed on it, such that there are two prisms with polarization sensitive reflective elements of each orientation. In another embodiment, two prisms may have polarization sensitive reflective elements of opposite orientations placed on the two sides of the prism.

Once the polarization sensitive reflective elements are applied, the prisms 410, 415, 420, 425 may be attached to each other. In one embodiment, the prisms are glued together with index matched glue, which does not have an optical effect.

The path length extender 430 is then attached to a base of a prism, here prism 4 440. In one embodiment, the path length extender 430 is also made of glass or plastic transparent to the wavelengths used by the system, and it is glued using index matched glue. In another embodiment, as shown above in FIG. 1B, one of the prisms may include an integral light path extender. In that configuration, the light path extender does not need to be attached to the prism.

The quarter wave plates 435, 445 are then coupled to the sides of the cuboid formed by the prisms 410, 415, 420, 425 and the light path extender 430. In one embodiment, the quarter wave plates 435, 445 may be a film applied to the base of the prism 415 and path length extender 430. Mirrors 440, 447 are coupled to the quarter wave plates 435, 445. In one embodiment, the mirrors are glued on, using index matched glue.

Although the prisms 410, 415, 420, 425 here are shown as relatively short pieces, in one embodiment the system may be assembled as a large rectangle, and then cut to an appropriate size. The size, in one embodiment, depends on the aperture of the system. In one exemplary embodiment, the face formed by the prisms is 5 mm×5 mm (H), and the length of the OPLE (L) is 12 mm. The length may be between 5 mm and 100 mm.

Figure 4B:
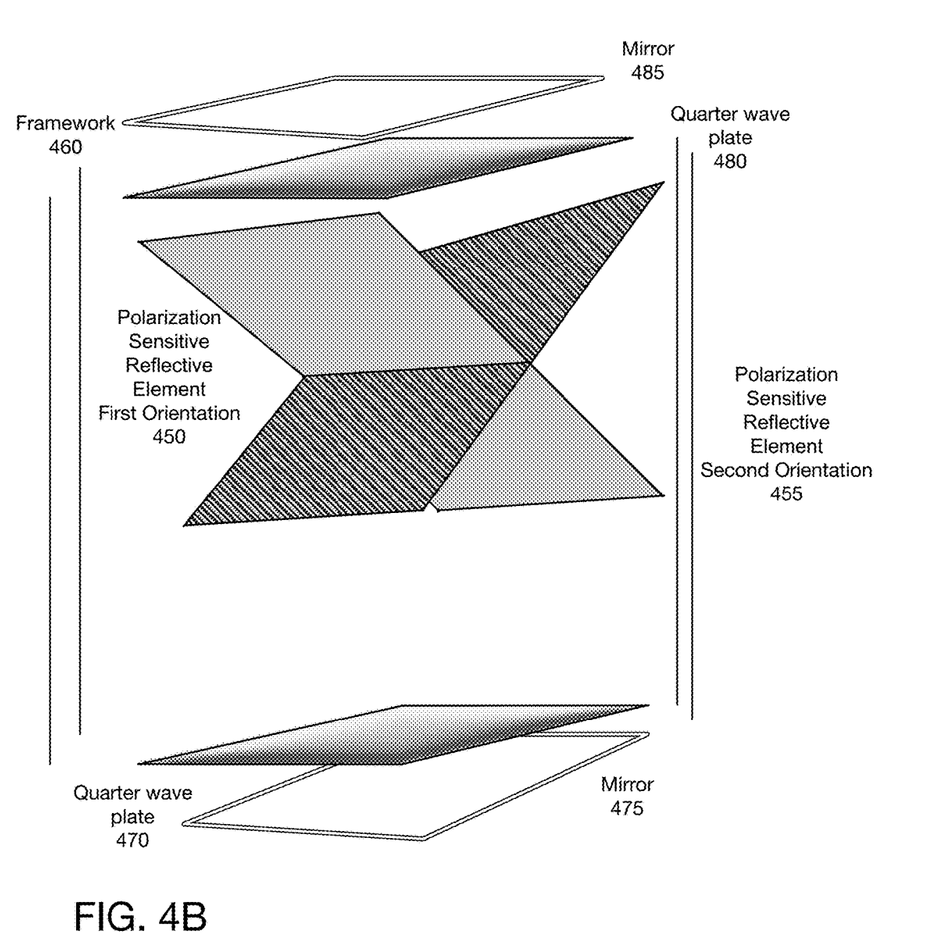
FIG. 4B is a diagram of one embodiment of the assembly of one embodiment of an orthogonal OPLE.

FIG. 4B illustrates one embodiment of the assembly of an OPLE without the prisms. In one embodiment, polarization sensitive reflective elements of the first orientation 450 and second orientation 455 are intersected. The polarization sensitive reflective elements 450, 455 are placed on a support structure, in one embodiment. The support structure may be plastic, glass, film, or another optically clear material which can provide structure for the polarization sensitive reflective elements s 450, 455. In one embodiment, the polarization sensitive reflective elements 450, 455 and their support structure have half slits, so the two polarization sensitive reflective elements 450, 455 slide into each other forming an X shape. In one embodiment, the polarization sensitive reflective elements 450, 455 are perpendicular to each other, and the wire grid polarizer with the first orientation is at a −45 degree angle from the entrance surface of the OPLE.

In one embodiment, in this configuration the center of the OPLE has a non-reflective area to ensure that no negative optical effects are introduced into the system. In one embodiment, the OPLE includes the polarization sensitive reflective elements 450, 455, quarter wave plates 470, 480, and mirrors 480, 485.

The structure is supported by a framework 460, illustrated for simplicity by framing elements. The framework in one embodiment may be plastic, glass, or another material, and need not be transparent as long as it is capable of supporting the mirror and polarization sensitive reflective elements. In one embodiment, the quarter wave plates 470, 480 may be attached to the mirror 475, 485. In one embodiment, there may be a path length extender (not shown). In another embodiment, the bottom of polarization sensitive reflective elements 450, 455 is positioned a height h2 above the quarter wave plate 470 and mirror 475 to create the spacing of the path length extender without requiring a physical object.

From FIGS. 4A and 4B it should be clear how to assemble the various OPLE configurations shown in FIGS. 1A, 1B, 2A, 2B, 2C, 2D, and 2E. Although these embodiments are separately shown, one of skill in the art would understand that elements from the configurations may be utilized in other configurations as well.

Figure 5:
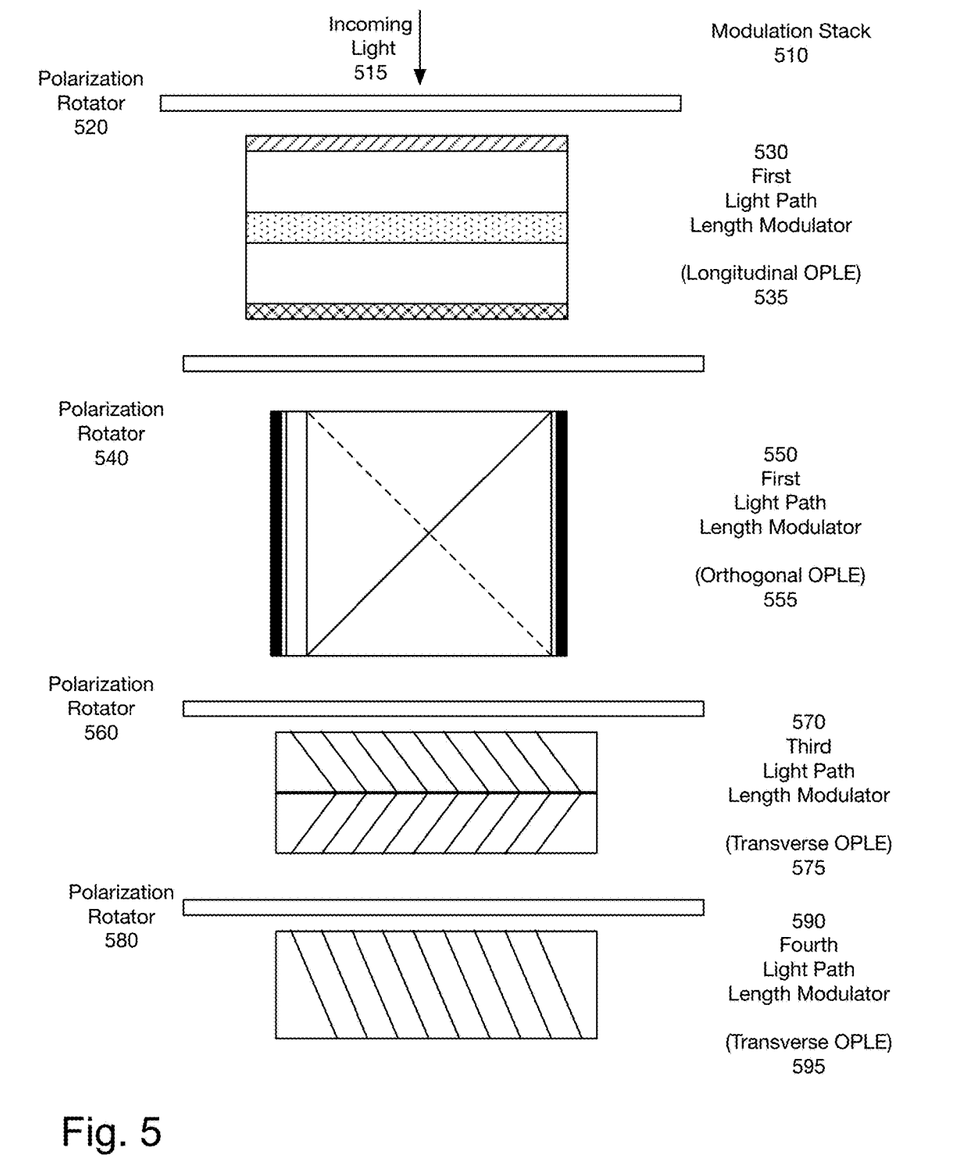
FIG. 5 is a diagram of one embodiment of a modulation stack including the orthogonal OPLE.

FIG. 5 is a diagram of one embodiment of a modulation stack including a plurality of OPLEs. This exemplary modulation stack includes four digital light path length modulators, each of the modulators 530, 550, 570, and 590 includes a polarization modulator and an OPLE. In this example, the first OPLE 535 is a longitudinal OPLE 535, the second OPLE is an orthogonal OPLE 555, the third and fourth OPLEs are transverse OPLEs 575, 595. With the shown set of four different OPLEs, the system can create up to sixteen focal lengths by selectively modulating the polarization.

In one embodiment, because the light exits from both sides of a longitudinal OPLE, the longitudinal OPLE 535 is preferentially a first OPLE in a modulation stack 510 that includes longitudinal OPLEs.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A system to adjust light path length comprising a digital light path length modulator, the digital light path length modulator comprising:
    a polarization modulator to receive light and to modulate a polarization of some or all of the light; and
    an optical path length extender (OPLE) to direct the light entering the OPLE with a first polarization along a first light path through the OPLE, and to direct the light entering the OPLE with a second polarization along a second light path through the OPLE, the second light path through the OPLE having a light path length longer than the first light path length through the OPLE;
    a second digital light path length modulator, the second digital light path length modulator comprising:
        a second polarization modulator, to receive the polarized light exiting from the OPLE, and to modulate the polarization of some or all of the polarized light; and
        a second OPLE to further alter relative light path lengths;
    thereby creating a plurality of digitally selectable path lengths.

2. The system of claim 1, wherein the OPLE is an orthogonal OPLE comprising:
    a rectangular cuboid body comprising:
    an entry surface;
    an exit surface substantially parallel to the entry surface;
    a first side and a second side substantially perpendicular to the entry surface;
    an angled polarization sensitive reflective element having a first orientation extending along a diagonal from the entry surface to the exit surface;
    a first mirror and first quarter wave plate, for reflecting light and changing a type of polarization of the light on the first side; and
    a second mirror and a second quarter wave plate on the second side.

3. The system of claim 2, further comprising:
    a second angled polarization sensitive reflective element having a second orientation extending along a second diagonal from the entry surface to the exit surface, the second angled polarization sensitive reflective element crossing the first polarization sensitive reflective element; and
    a path length extender above the second quarter wave plate on the second side.

4. The system of claim 3, wherein the first diagonal and the second diagonal are formed by four triangular prisms.

5. The system of claim 4, wherein a first prism and a second prism of the four prisms have a first face with a first wire grid polarizer with a first orientation and the second face with a second wire grid polarizer with the second orientation, such that when the four prisms are coupled, the first diagonal and the second diagonal extends through the rectangular cuboid of the orthogonal OPLE.

6. The system of claim 3, wherein the light with the first polarization traverses the orthogonal OPLE by entering the entry surface, being reflected by the wire grid polarizer with the first orientation to the first wave plate, changing to the second polarization, being reflected by the first mirror, and being reflected by the wire grid polarizer with the second orientation to the exit surface.

7. The system of claim 6, wherein the light with the second polarization traverses the orthogonal OPLE by entering the entry surface, being reflected by the wire grid polarizer with the second orientation to the light path extender, then passing through the second wave plate, changing to the first polarization, being reflected by the second mirror, passing through the wave plate, and the light path extender before being reflected by the wire grid polarizer with the first orientation to the exit surface.

8. The system of claim 2, wherein the angled polarization sensitive reflective element is a wire grid polarizer, and the wire grid polarizer is one of: glued, nano-imprinted, and deposited onto a support structure.

9. The system of claim 8, wherein the support structure for the wire grid polarizer is one of: a prism, a sheet of glass, a sheet of plastic, and a film.

10. The system of claim 2, wherein a first mirror is a curved mirror with an optical power, the optical power of the mirror shifting a virtual image distance.

11. The system of claim 2, wherein the an angled polarization sensitive reflective element comprises a wire grid polarizer, and further comprising:
    a framework to support the wire grid polarizer.

12. The system of claim 2, wherein a distance between the first side and the second side is adjustable, to alter a light path length.

13. A system comprising:
    an optical path length extender (OPLE) having two light paths having different path lengths, such that light entering the OPLE with a first polarization is directed through a first light path, and light entering the OPLE with a second polarization is directed through a second light path having a light path length longer than the first light path length through the OPLE;
    a polarization modulator, to receive the polarized light exiting from the OPLE, and to modulate the polarization of some or all of the polarized light; and a second OPLE to further alter relative light path lengths; thereby creating a plurality of digitally selectable path lengths.

14. The system of claim 13, wherein the OPLE is a rectangular cuboid comprising:
   a first quarter wave plate and a first mirror on a first side of the OPLE;
   a second quarter wave plate and a second mirror on a second side of the OPLE; and
   a diagonal polarization sensitive reflective element extending across a body of the rectangular cuboid.

15. The system of claim 14, wherein the diagonal polarization sensitive reflective element is a wire grid polarizer supported by a support structure.

16. The system of claim 15, wherein the support structure is one of: a prism, a sheet of plastic, a sheet of glass, and a film.

17. The system of claim 14, wherein the polarization sensitive reflective elements comprise a first wire grid polarizer having a first orientation extending along a first diagonal, and a second wire grid polarizer having a second orientation extending along a second diagonal of the OPLE.

18. An orthogonal optical path length extender (OPLE) comprising a rectangular cuboid, the orthogonal OPLE comprising:
   a first angled polarization sensitive reflective element with a first orientation extending along a first diagonal from an entry surface to an exit surface;
   a second angled polarization sensitive reflective element having a second orientation extending along a second diagonal from the entry surface to the exit surface, the second angled polarization sensitive reflective element perpendicular to the first polarization sensitive reflective element, the second angled polarization sensitive reflective element crossing the first angled polarization sensitive reflective element;
   a quarter wave plate and a mirror positioned on a first side of the OPLE, for reflecting light and changing a type of polarization of the light on the first side; and
   a second quarter wave plate and a second mirror on a second side of the OPLE;
   a path length extender positioned above the second quarter wave plate on the second side;
   such that light with a first polarization has a light path that is longer by two times a height of the path length extender.

19. The OPLE of claim 18, wherein the first diagonal and the second diagonal are formed by four triangular prisms, and
   wherein a first prism and a second prism of the four prisms have a first face with a first wire grid polarizer with a first orientation and the second face with a second wire grid polarizer with the second orientation, such that when the four prisms are coupled, the first diagonal and the second diagonal extend through the orthogonal OPLE.

20. The OPLE of claim 18,
   wherein the light with the first polarization traverses the orthogonal OPLE by entering the entry surface, being reflected by the angled polarization sensitive reflective element with the first orientation to the first wave plate, changing to the second polarization, being reflected by the first mirror, and being reflected by the angled polarization sensitive reflective element with the second orientation to the exit surface; and
   wherein the light with the second polarization traverses the orthogonal OPLE by entering the entry surface, being reflected by the angled polarization sensitive reflective element with the second orientation to the light path extender, then passing through the second wave plate, changing to the first polarization, being reflected by the second mirror, passing through the wave plate and the light path extender before being reflected by the angled polarization sensitive reflective element with the first orientation to the exit surface.

* * * * *